April 23, 1940.   W. R. POSTLEWAITE   2,198,178
HELICAL FEED DEVICE
Filed Dec. 5, 1938   3 Sheets-Sheet 1

INVENTOR
WILLIAM R. POSTLEWAITE
BY
ATTORNEY

April 23, 1940.    W. R. POSTLEWAITE    2,198,178
HELICAL FEED DEVICE
Filed Dec. 5, 1938        3 Sheets-Sheet 2

INVENTOR
WILLIAM R. POSTLEWAITE
BY
ATTORNEY

April 23, 1940.  W. R. POSTLEWAITE  2,198,178
HELICAL FEED DEVICE
Filed Dec. 5, 1938   3 Sheets-Sheet 3

INVENTOR
WILLIAM R. POSTLEWAITE
BY
ATTORNEY

Patented Apr. 23, 1940

2,198,178

UNITED STATES PATENT OFFICE 2,198,178

HELICAL FEED DEVICE

William R. Postlewaite, San Francisco, Calif., assignor to Standard Oil Company of California, San Francisco, Calif., a corporation of Delaware Application December 5, 1938, Serial No. 243,928

9 Claims. (Cl. 242—11)

This invention relates to a mechanism for continuously and controllably imparting a helical motion to a cylindrical object such as a pipe, and particularly refers to improved means for controlling a chain or similar flexible member which is used to impart a rotational component of the helical motion. This invention is an improvement over the helical feed mechanism of Patent 2,112,865, issued April 5, 1938, to J. F. Putnam, and differs from it primarily in the means used to supply the rotational component of the helical motion and in the means for controlling the last named means. This application is a continuation-in-part of my application Serial No. 148,245, filed June 14, 1937, which issued July 18, 1939, as Patent No. 2,166,608.

Certain continuous pipe coating operations, for example that of my Patent 2,040,876, issued May 19, 1936, require that a helical feed, i. e., a combined rotating and longitudinal motion, be given to the pipe so that any given point on its outer surface describes a helix in order that a coating of paint, or a plastic layer of corrosion resisting material, or a flexible tape adapted to prevent corrosion, may be applied continuously.

Heretofore helical feed mechanisms, such as that of Patent 2,112,865, have utilized a flat belt which is wrapped helically around the pipe and passes over guide pulleys, one of which latter is used to drive the belt so that it will give a rotational component to the helical motion of the pipe. In that patent the helix angle is definitely controlled by opposed rollers which support the pipe and are inclined with respect to its axis. Such an arrangement is also disclosed in my Patent No. 2,166,608. These rollers are the sole controlling means for the helical motion as distinguished from those earlier mechanisms such as that of the H. S. Christopher Patent 1,668,265 in which the belt alone is used to control the helix angle.

It has been found that the use of a flat belt, which is flexible only at right angles to the plane of its width and has no appreciable degree of flexibility in the latter plane, introduces excessive shearing forces in the plane of the belt causing it to disintegrate very rapidly, particularly where the apparatus is arranged to operate upon various diameters of pipe or the like. This invention comprehends broadly the use of a chain or some similar means which is flexible in any direction about its longitudinal axis, and specifically relates to means for guiding the chain and maintaining a substantially constant tension on it regardless of small variations in the diameter of the pipe and eccentricities of motion caused by crooked pipe.

It is an object of this invention to provide an improved helical feed device which will operate upon pipes of widely different diameters without material adjustment, which will provide improved traction of the driving element on the outer surface of the pipe so that it may be forced through coating machines against a high resistance, and which will distribute the contact pressure against the pipe over a large area so that a priming coat on the pipe will not be substantially marred or broken.

These and other objects and advantages will be further apparent from the following description and from the accompanying drawings which form a part of this specification and illustrate a preferred embodiment of an apparatus suitable for carrying out this invention.

Figure 1:
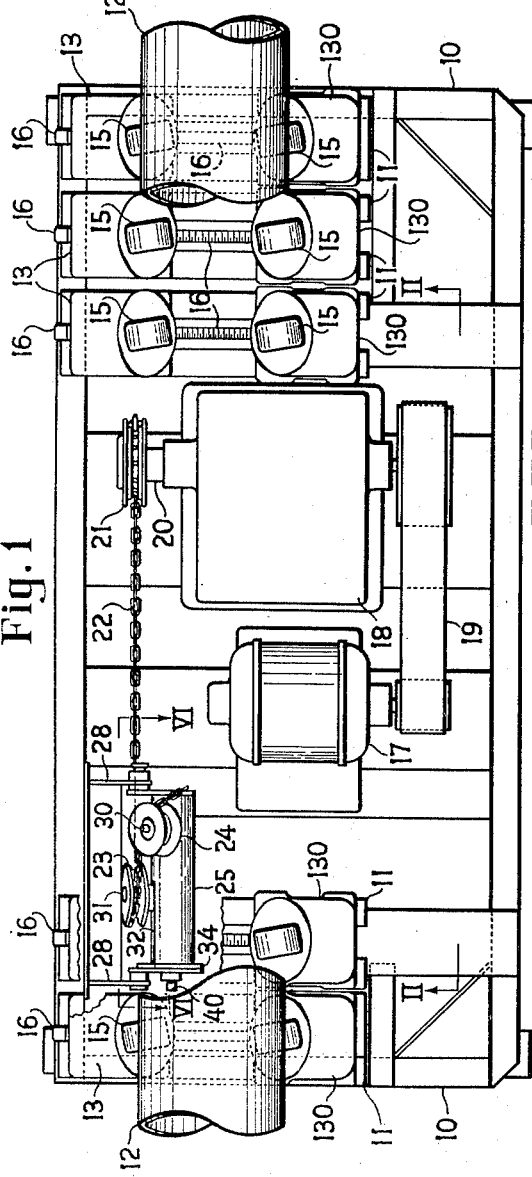
Figure 1 is a plan view of a helical feed device, showing fragmentary portions of a pipe which is to be advanced. Part of one roller support is broken away to show the position of the chain guide means.

Referring to Figure 1, which could be considered a general assembly view of the apparatus, reference numeral 10 designates a base for the device on which are mounted a number of flanged tracks 11 at right angles to the axis AA of pipe 12 which is to be helically advanced. At one end of each track is secured a fixed bracket member 13 having an inclined bearing plate 14, the latter provided with journals in which is mounted a roller 15. Bearing plates 14 are each mounted so as to be movable about an axis BB (Figure 4) which preferably intersects the longitudinal axis AA of pipe 12 and is at an angle of about 45 degrees below the horizontal. Rollers 15 are preferably faced with a resilient material and may be adjusted by means of bearing plates 14 to be inclined at a predetermined angle with respect to the axis AA of pipe 12 (Figure 1). This will be the helix angle of the pipe motion.

Figure 4:
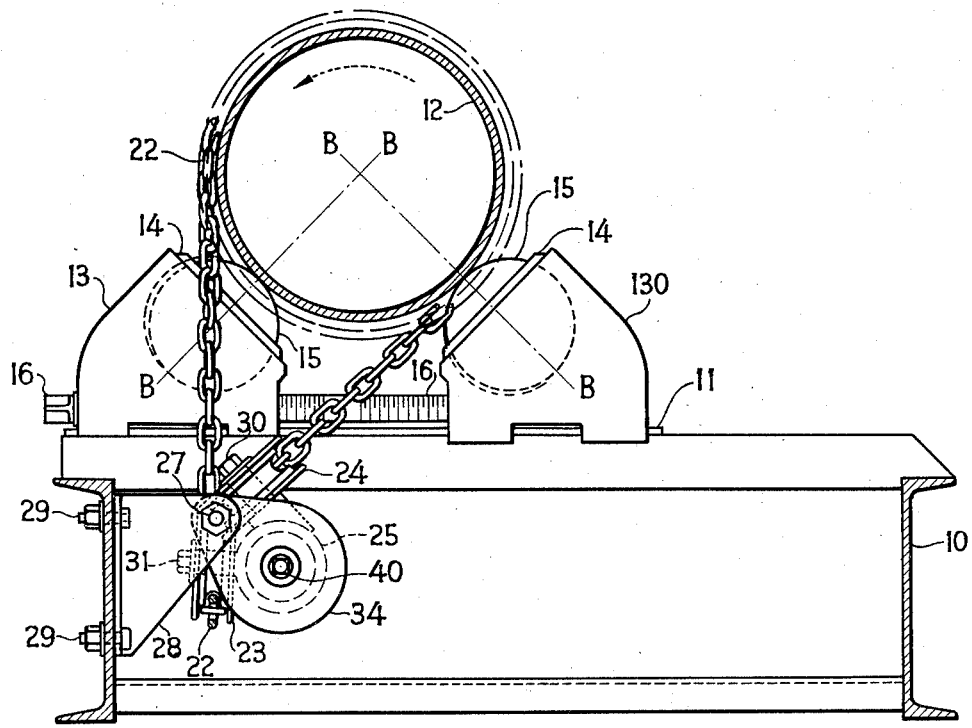
Figure 4 is a vertical sectional view on line IV—IV of Figure 2, showing in more detail the chain guide means adjusted to receive a large diameter pipe.
Figure 5:
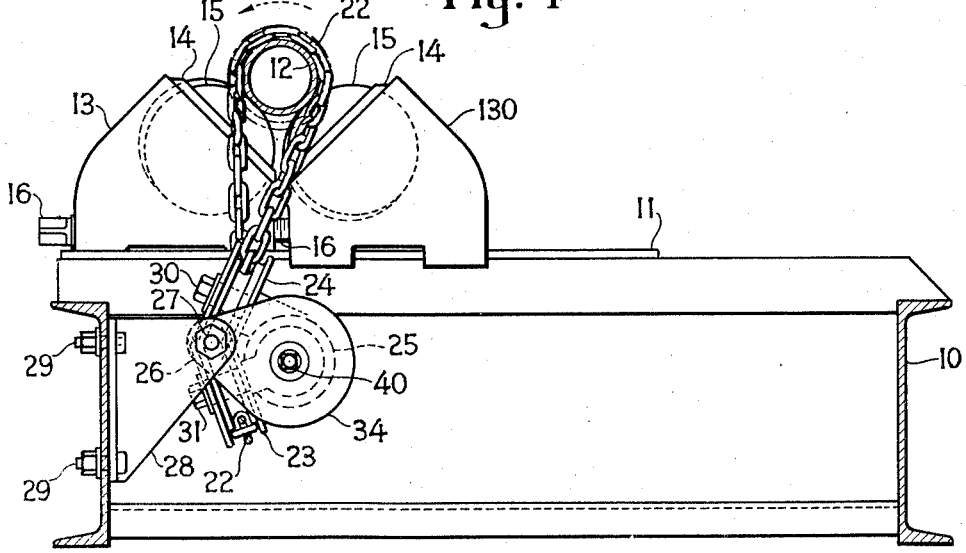
Figure 5 is a vertical sectional view on line V—V of Figure 2, showing in more detail the chain guide means adjusted to receive a small diameter pipe.

Similar brackets 130 are slidably mounted on tracks 11 and are similar in all respects to brackets 13 except that they are provided with an adjusting screw 16 so that their spacing from brackets 13 may be varied to suit the diameter of the pipe 12 being handled (Figures 4 and 5). Brackets 130 are provided with inclined bearing plates 14 and rollers 15, these rollers cooperating with the rollers on brackets 13 to control the helix angle of the pipe as described and claimed in Patent 2,112,865.

Mounted in frame 10 is a suitable prime mover, such as motor 17, in this case adapted to drive a variable speed mechanism 18 by means of a belt 19. The slow speed shaft 20 of variable speed means 18 is provided with a recessed chain drive sprocket 21. An endless chain 22 passes around drive sprocket 21, tension sprocket 23, guide sprocket 24, and then is wrapped several times around pipe 12. It is desirable, although not necessary, that the pitch of the wrapping around pipe 12 be substantially equal to the pitch of the helical feed imparted to pipe 12 by rollers 15. If the rollers 15 are angularly adjusted it will be found that the pitch of the chain will conform automatically to that of the rollers.

Figures 6, 7:
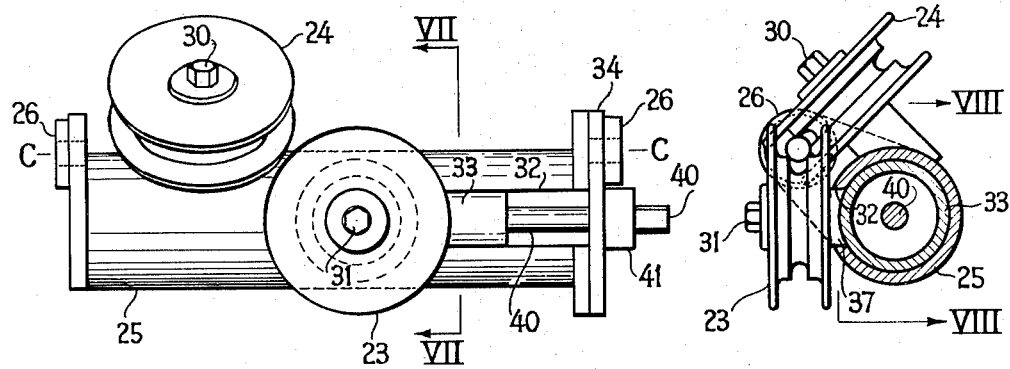
Figure 6 is a vertical sectional view on line VI—VI of Figure 1, showing the preferred arrangement of guide pulleys on the chain tensioning member.
Figure 7 is a vertical sectional view on line VII—VII of Figure 6, showing the relationship between the chain guide pulleys and the pivoted support for the tensioning means.
Figure 8:
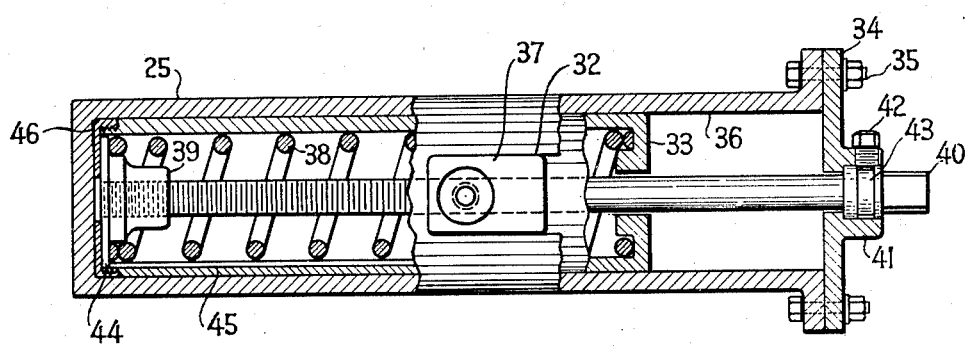
Figure 8 is a longitudinal and part sectional view of a preferred chain tensioning means.

Referring to Figures 4, 6 and 8, it will be noted that tension sprocket 23 and guide sprocket 24 are supported by a cylindrical body 25, the latter provided with transverse brackets 26 which are pivotally secured by bolts 27 to brackets 28, the latter being secured to one side of frame 10 by bolts 29. It will be noted that sprockets 23 and 24 are tangent to the axis CC around which cylinder 25 may be adjusted, which axis passes through the center of bolts 27. The angularity between sprockets 23 and 24 is determined by the range of diameters of the pipes to be handled and will be obvious to one skilled in this art. Guide sprocket 24 is mounted for rotation on shaft 30, extending outwardly from cylindrical member 25. Tension sprocket 23 is mounted upon shaft 31 which extends outwardly through slot 32 from a cylindrical slider 33 inside the body of cylinder 25. This construction is indicated in some detail in Figures 6, 7 and 8.

Referring to Figure 8, it will be noted that cylindrical member 25 is hollow and is provided with a flanged cover 34 secured by bolts 35. Slider 33 is fitted to move freely in the bore 36 of member 25 and is provided with a boss 37 to receive shaft 31 on which is mounted tension sprocket 23. Boss 37 is adapted to project outwardly through the wall of cylinder 25 and to be guided by slot 32. In order to urge tension sprocket 23 away from drive sprocket 21 so that it will maintain a substantially constant tension on chain 22, a spring 38 is positioned inside of slider 33 and bears against a bushing 39, this bushing being threaded on an adjusting spindle 40. Spindle 40 is retained in a boss 41 of cover plate 34 by means of screw 42 which engages an annular recess 43 in spindle 40. Bushing 39 is flanged as shown to receive spring 38 and is provided with a key 44 which is received in keyway 45 within slider 33, thus acting to prevent rotation of bushing 39 relative to the slider. A cap 46 is threadedly connected to the open end of slider 33 to prevent bushing 39 becoming disconnected from spindle 40.

The construction just outlined is designed to maintain sprocket 23 in its tangential position with respect to axis CC and at the same time resiliently urge sprocket 23 away from sprocket 21, boss 37 which supports sprocket 23 being guided in slot 32 so that slider 33 is prevented from rotating within the bore 36 of cylinder 25. If it is desired to increase the tension of chain 22, spindle 40 is rotated to compress spring 38, thus urging slider 33 toward cover plate 34. Slot 32 having considerable length will ordinarily permit chain 22 to be wrapped about various different sizes of pipe without changing the length of the chain.

Figure 3:
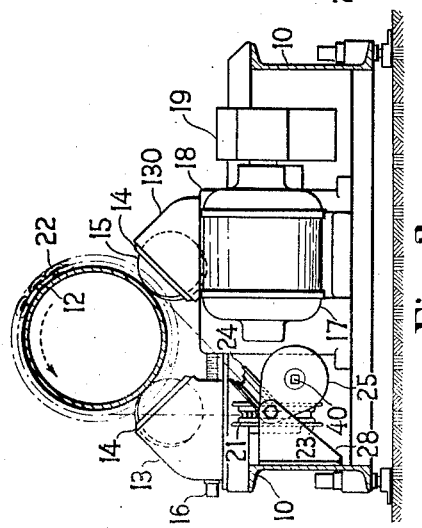
Figure 3 is a vertical sectional view on line III—III of Figure 2, showing the preferred arrangement of chain guide means.
Figure 9:
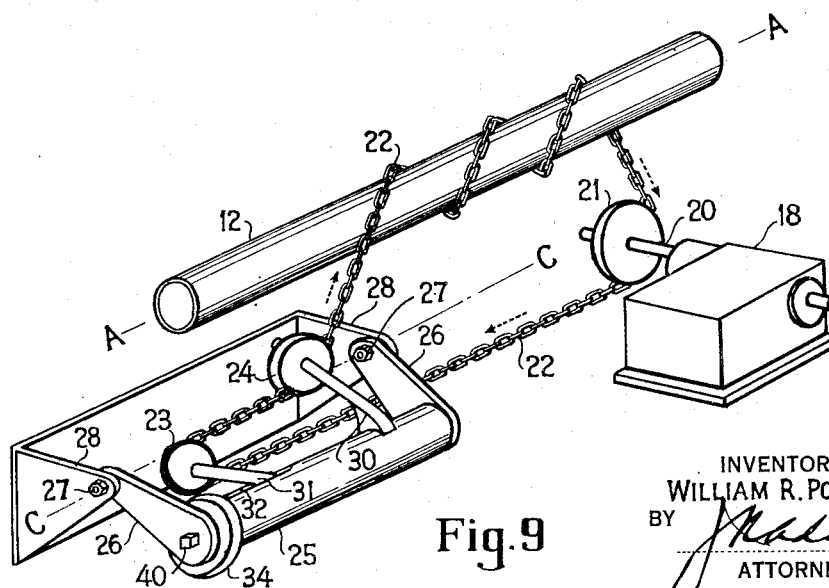
Figure 9 is a schematic diagram of the arrangement of the pipe, chain, drive means for the chain, and chain guide and tensioning means.

Referring to Figures 4 and 5, it will be noted that cylinder 25 may be adjusted about axis CC and clamped in any desired position by means of bolts 27 so that the plane of rotation of guide sprocket 24 will be tangent to the periphery of pipe 12. This will insure the least amount of internal friction in chain 22 and wear against the sides of sprocket 24. Drive sprocket 21 is preferably slidably mounted on shaft 20 so that its plane of rotation may be moved to be tangent to the opposite side of pipe 12 (Figures 1, 3 and 9). Because of the tangential relationship of tension sprocket 23, guide sprocket 24 and axis CC, adjustments of cylinder 25 to accommodate different sizes of pipe will ordinarily not require changes in the length of chain 22.

Figure 2:
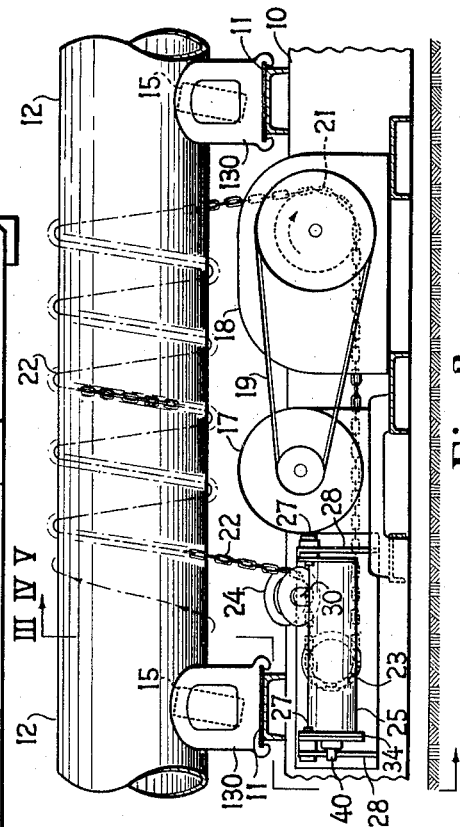
Figure 2 is a vertical sectional view on line II—II of Figure 1, illustrating the arrangement of the chain drive.

In operation pipe 12 is supported on one or more sets of rollers 15 and chain 22 is wrapped around it as shown in Figure 2, the tension of slider 33 having first been released by spindle 40. Bearing plates 14 are adjusted to the desired pitch angle of the helical motion which is to be imparted to the pipe by the machine, and brackets 130 are spaced from brackets 13 by means of screws 16 so that the axis BB of rollers 15 and plates 14 approximately intersect at the center of pipe 12. Cylinder 25 is then adjusted about axis CC so that the plane of rotation of guide roller 24 is approximately tangential to that side of pipe 12 which rests on brackets 130. Cylinder 25 is then clamped in position by means of bolts 27. Drive sprocket 21 is adjusted on shaft 20 until its plane of rotation is approximately tangent to that side of pipe 12 which rests on brackets 13. These adjustments having been made motor 18 may be supplied from any suitable source of electric power to drive speed reducer and variable speed mechanism 18 through belt 19 thus urging chain 22 in the direction shown. The chain will impart a rotational component to the pipe and rollers 15 will control the helix angle of its advance. It is contemplated that this apparatus will be used to coat successive lengths of pipe 12 which may be joined together by means of the coupling in my Patent 2,077,769 and may be presented to the apparatus here shown by means of the pipe feed device of my Patent No. 2,166,608. Obviously other forms of coupling or of pipe handling mechanisms may be employed in place of those just specified.

The essential features of this invention appear to reside in the use of a chain or other tension transmitting elements flexible in all directions with respect to its longitudinal axis and in means for guiding and tensioning the chain or its equivalent so that a minimum number of adjustments will be required to adapt the apparatus for various sizes of pipe. The preferred environment for these means is in combination with a helical feed mechanism of Patent 2,112,865, issued April 5, 1938, to J. F. Putnam. This is characterized by means for rotating a pipe, in this case the chain or its equivalent; and having guiding elements independent of said pipe rotating means, in this case the angularly disposed rollers, said rollers being engageable with the pipe and adjustable so that the pitch angle of the helix may be controlled. Although a specific construction has been described and illustrated it is obvious that many changes and modifications can be made without departing from the essential features of the invention, and all such modifications as are within the scope of the following claims are embraced thereby.

I claim:

1. A helical feed device comprising means for rotating a pipe, two opposed banks of guiding elements independent of said means engageable with the pipe and angularly disposed with respect to the pipe axis for controlling the effect of said first named means to produce a combined rotary and longitudinal movement of the pipe, means for adjustably positioning the first bank of said guiding elements in a direction transverse to the pipe axis to accommodate varying diameters of pipes without substantially changing the position of one side of said pipes, said pipe rotating means comprising a tension transmitting element flexible in all directions with respect to its longitudinal axis, and guide means for said tension transmitting element positioned adjacent the second or non-adjustable bank of pipe guiding elements to guide said tension transmitting element in planes substantially tangential to the respective sides of said pipe engaged by said tension transmitting element.

2. A helical feed device according to claim 1, in which said tension transmitting element comprises an endless chain, and the guide means for said tension transmitting chain comprises a plurality of guide sprockets, and means for resiliently urging one of said sprockets in a direction parallel to the axis of said pipe to tighten said tension transmitting chain, said sprockets being tangential to an axis parallel to said pipe axis.

3. A helical feed device comprising means for rotating a pipe, opposed guiding elements independent of said means engageable with the pipe and angularly disposed with respect to the pipe axis for controlling the effect of said first named means to produce a combined rotary and longitudinal movement of the pipe, means for adjustably positioning one set of said guiding elements in a direction transverse to the pipe axis, said pipe rotating means comprising a tension transmitting element wrapped around said pipe to engage the same, said element being flexible in all directions with respect to its longitudinal axis, and a plurality of guide sprockets for said tension transmitting element, and means for resiliently urging one of said sprockets in a direction parallel to the axis of said pipe to act as a tension sprocket and tighten said tension transmitting element.

4. A helical feed device according to claim 3, with the addition of means for positioning one of said guide sprockets to be rotatable in a plane tangential to the outer surface of the pipe being rotated.

5. A helical feed device according to claim 3, with the addition of means for positioning one of said guide sprockets to be rotatable in a plane tangential to the outer surface of the pipe being rotated, the plane of rotation of said tension sprocket intersecting the plane of rotation of said guide sprocket in a line tangential to both said sprockets.

6. A helical feed device of the type disclosed, comprising a plurality of rollers engageable with the pipe and angularly disposed with respect to the pipe axis, and means for imparting a rotational component to said pipe adapted to cooperate with said rollers so that said rollers will produce a controlled helical motion of said pipe, said last named means comprising a chain adapted to be wrapped around said pipe and to pass over a plurality of guide sprockets mounted upon an adjustable member, said member being positioned for limited rotation about an axis tangential to said sprockets and parallel to the axis of said pipe, and one of said guide sprockets is rotatable in a plane tangential to the outer surface of said pipe.

7. A helical feed device according to claim 6, in which one of said sprockets is slidable in a direction parallel to the axis of said pipe and is resiliently urged to increase the tension in said chain.

8. In a helical feed device of the type described, a guide means for a flexible tension element comprising a support on said machine, a member pivoted on said support for limited rotation about an axis parallel to said pipe, a guide sprocket on said member tangential to said axis, a tension sprocket mounted for longitudinal motion on said member and tangential to said axis, and means for urging said tension sprocket in a direction to tighten said flexible tension element.

9. In a helical feed device of the type described, a guide means for a flexible tension element comprising a support on said machine, a cylinder pivoted on said support for limited rotation about an axis parallel to said pipe, the axis of said cylinder being parallel to said last named axis, a guide sprocket on said cylinder tangential to said cylinder support axis, a slider in said cylinder provided with a boss extending outwardly through the wall of said cylinder, a tension sprocket journaled on said boss, said last named sprocket being tangential to said cylinder support axis, and resilient means in said cylinder urging said slider and said tension sprocket to tighten said tension element.

WILLIAM R. POSTLEWAITE.